United States Patent [19]

Tureck

[11] 4,201,434
[45] May 6, 1980

[54] PHOTOGRAPHIC EXTENSION FLASH CORD

[76] Inventor: Albert Tureck, 3728 W. Enfield, Skokie, Ill. 60076

[21] Appl. No.: 870,327

[22] Filed: Jan. 18, 1978

[51] Int. Cl.² .................. G03B 15/05; G03B 15/07
[52] U.S. Cl. ........................... 339/28; 339/154 L; 339/163; 362/11
[58] Field of Search ............................. 362/3–13; 339/28, 29, 154, 155, 156, 163; 431/95

[56] References Cited

U.S. PATENT DOCUMENTS

| | | | |
|---|---|---|---|
| 2,302,031 | 11/1942 | Jacobson | 362/10 |
| 2,480,336 | 8/1949 | Orme | 362/3 |
| 2,634,309 | 4/1953 | Barnes | 339/29 R |
| 2,638,764 | 5/1953 | Schwartz et al. | 362/7 |
| 3,917,944 | 11/1975 | Eisenberger et al. | 362/4 |

OTHER PUBLICATIONS

Popular Science, 12–1977, p. 68.

Primary Examiner—Neil Abrams
Attorney, Agent, or Firm—George H. Gerstman

[57] ABSTRACT

A connector system is provided for an electronic flash unit. A first connector member comprises a male hot shoe plug for electrically and mechanically engaging the female hot shoe receptacle of a camera. The upper portion of the first connector member comprises a female hot shoe receptacle. An electrically conductive extension line couples the first connector member to a second connector member. The second connector member comprises a female hot shoe receptacle at its upper portion, and its lower portion defines a threaded aperture for receiving a tripod mount.

1 Claim, 4 Drawing Figures

U.S. Patent    May 6, 1980    4,201,434
FIG. 1
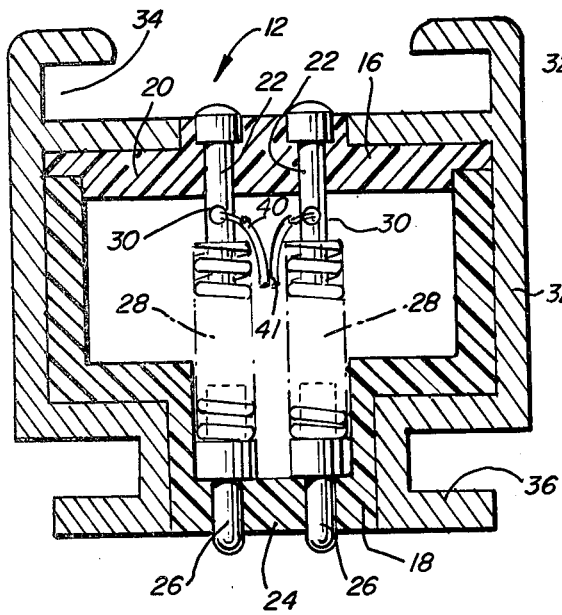
FIG. 2
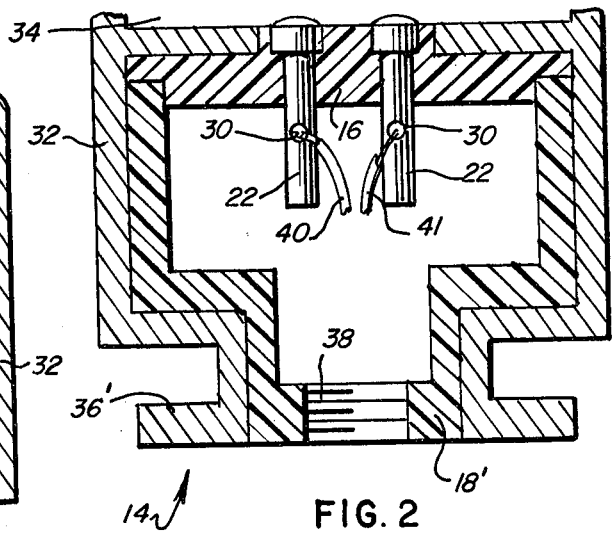
FIG. 3
FIG. 4
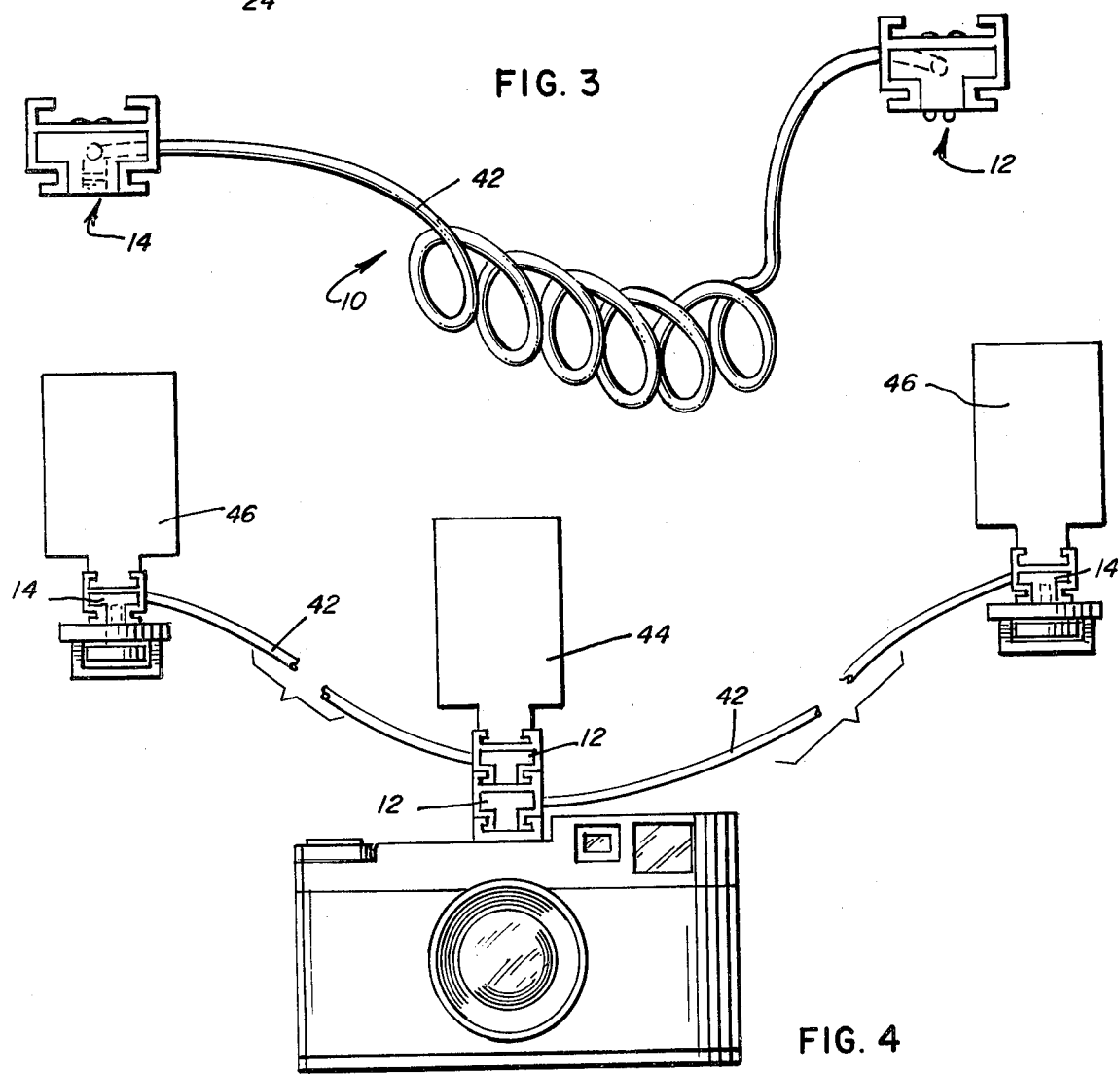

PHOTOGRAPHIC EXTENSION FLASH CORD

BACKGROUND OF THE INVENTION

This invention relates to a novel connector system for an electronic flash unit, in which the hot shoe of a camera is utilized.

Conventional photographic cameras, particularly 35 mm cameras, include a female hot shoe receptacle for coupling to the male hot shoe plug of an electronic flash unit. On many occasions it is desirable to extend the flash unit at a distance from the camera for proper lighting effects. Typically, when an extended flash is used, a PC cord is coupled from the extended electronic flash unit to the PC connector of the camera. I have discovered, however, that it would be extremely desirable to have one electronic flash unit attached to the camera with a second electronic flash unit spaced a predetermined distance from the camera. I have also discovered that it would be advantageous to be able to have several flash units spaced from the camera with a flash unit attached to the camera.

In prior art constructions wherein a flash unit was carried by the camera but an extension flash unit was necessary, the extension flash unit would be coupled to the PC connector of the camera by a PC cord, while the flash carried by the camera may be connected directly to the camera's hot shoe. The use of a PC cord is disadvantageous, however, because it often disengages from the PC contact of the camera. I have discovered that a hot shoe connection is far more secure than a PC cord connection and for that reason my invention takes advantage of the conventional female hot shoe receptacle of a camera in order to provide a secure connection and an efficient flash connector system.

It is, therefore, an object of the present invention to provide a connector system for an electronic flash unit which is simple in construction and easy to manufacture.

Another object of the present invention is to provide a connector system for an electronic flash unit which takes advantage of the conventional female hot shoe receptacle of a camera.

Other objects and advantages of the present invention will become apparent as the description proceeds.

SUMMARY OF THE INVENTION

In accordance with the present invention, a connector system is provided for an electronic flash unit for use with a camera having a female hot shoe receptacle. The system of the present invention comprises a first connector member having a lower portion and an upper portion. The lower portion includes a male hot shoe plug for electrically and mechanically engaging the female hot shoe receptacle of a camera. The upper portion comprises a female hot shoe receptacle. Means are provided for electrically coupling the upper portion and the lower portion so as to provide an electrical connection from the camera female hot shoe receptacle to the upper portion's hot shoe receptacle, when the first connector member is connected to the camera.

An electrically conductive extension line is provided in electrical contact with the first connector member and is coupled to a second connector member. The second connector member comprises a lower portion and an upper portion. The upper portion of a second connector member comprises a female hot shoe receptacle. In this manner, an electrical connection is provided, when the first connector member is connected to the camera, from the camera female hot shoe receptacle to the female hot shoe receptacle of the second connector member.

In the illustrative embodiment, the lower portion of the second connector member defines a threaded aperture receiving a tripod mount.

In the illustrative embodiment, the first connector member upper portion comprises at least one metal rod fixed to an insulative support. The first connector member lower portion comprises at least one metal rod movable relative to an insulative support. The means electrically coupling the first connector member upper portion and lower portion comprises metal spring means coupling the metal rods.

A more detailed explanation of the invention is provided in the following description and claims, and is illustrated in the accompanying drawings.

BRIEF DESCRIPTION OF THE DRAWINGS

FIG. 1 is a cross-sectional elevation of a first connector member constructed in accordance with the principles of the present invention;

FIG. 2 is a cross-sectional elevation of a second connector member constructed in accordance with the principles of the present invention;

FIG. 3 is a view of a connector system constructed in accordance with the principles of the present invention; and FIG. 4 is a view of a pair of connector systems coupled to a camera.

DETAILED DESCRIPTON OF THE ILLUSTRATIVE EMBODIMENT

Referring to the drawings, the connector system 10 shown therein comprises a first connector member 12 and a second connector member 14. First connector member 12 is shown in most detail in FIG. 1, and comprises an upper portion 16 and a lower portion 18. The upper portion includes an insulative support 20 to which metal rods 22 are fastened and the lower portion 18 includes an insulative support 24 to which metal rods 26 are movable relative thereto. Metal rods 22 and 26 are coupled by means of a metal spring 28 which allows metal rods 26 to move with respect to insulative support 24. The metal rods are hollow and define a radial passage 30.

A metal extrusion 32 is provided to form a female hot shoe receptacle 34 at upper portion 16 and a male hot shoe plug 36 at lower portion 18. While the first connector member 12 of FIG. 1 shows a pair of metal contacts 22-28-26, it is to be understood that many different types of electrical contact means may be used. For example, some hot shoes have only a single centralized metal contact with the outside metallic members 32 forming the only other metal contact. Other hot shoes utilize a main centralized metal contact with a pair of subsidiary metal contacts and a grounded frame. Thus, the particular layout of contacts is of no significance to the invention, because a large number of arrangements and layouts of contacts may be utilized without departing from the invention.

First connector member 12 may be coupled directly to the female hot shoe receptacle of a camera by inserting plug 36 into the camera's hot shoe receptacle. An electrical connection is provided from the camera's female hot shoe receptacle to the female hot shoe receptacle 34 of the connector member 12.

The upper portion 16 of the second connector member 14 is identical to upper portion 16 of the first connector member 12, and like reference numerals are used to designate like structural members. However, the lower portion 18' of second connector member 14 defines a threaded opening 38 which is adapted to receive the externally threaded bolt of a tripod, which is conventionally a one quarter inch thread.

Electrical contacts 22 of second connector member 14 are coupled to electrical contacts 22 of first connector member 12 by means of electrical lines 40, 41 which extend to the outside of the connector member to form a unitary insulative cable 42. Insulative cable 42, or cord 42 is preferably coiled so as to be as compact as possible. It can be seen that lower member 18 of second connector member 14 carries a male plug 36' which fits into a female hot shoe receptacle but does not contain the necessary contacts for completing an electrical circuit to metal rods 22. However, the second connector member may be coupled to the first connector member for easy carrying when the system is not in use.

As shown in FIG. 4, a number of connector systems may be coupled to a single camera. To this end, a plurality of first connector members 12 may be connected in tandem and second connector members 14 will extend therefrom, allowing the use of a centralized electronic flash 44 and a plurality of extension flashes 46. The electrical connections are such that the contacts of the female hot shoe receptacle from the camera will be electrically coupled through all of the first connectors to the female hot shoe receptacles of the second connector members.

The hot shoes which have only a single centralized metal contact with the outside metallic members forming the other metal contact, have been used for several years and generally comprise the positive and negative (ground) terminals for actuating the electronic flash. More recently, hot shoes with an additional one or pair of subsidiary metal contacts have been used, and are coming into widespread use in automated cameras. These subsidiary metal contacts are coupled to computer control integrated circuit chips for automated electronic flash functions. Various manufacturers locate these subsidiary metal contacts in various positions on the hot shoe so as to enable the subsidiary metal contacts to engage corresponding contacts on electronic flash units sold by the particular camera manufacturer. The control functions provided by the subsidiary metal contacts include the automatic seizing of control of the shutter and/or the diaphragm opening when the camera is set to its automatic flash mode. The Canon AE-1 is an example of a camera having a pair of subsidiary metal contacts on its hot shoe.

In order to take advantage of the hot shoes which utilize conventional contacts as well as subsidiary contacts, it has been necessary to connect the electronic flash directly to the hot shoe of the camera. In accordance with my invention, first connector member 12 may carry a pair of conventional contacts and a pair of subsidiary contacts, second connector member 14 may also carry a pair of conventional metal contacts and a pair of subsidiary contacts, and electrical cord 42 may carry four electrical lines for coupling the four electrical contacts of first connector member 12 to the four electrical contacts of second connector 14. This allows the new computerized flash units to be extended from the camera and retain the computer control functions, in contrast to the prior art extensions of such units which require the use of a PC cord, not having the capability of operating the computer control circuitry.

It can be seen that a secure connection has been provided for using a central electronic flash unit as well as extension electronic flash units from a camera, without resorting to the use of a PC cord. Further, the connector system of the present invention is simple in construction and easy to manufacture, enables convenient storage, and when in use, enables the easy coupling of an extension flash to a tripod mount.

Although an illustrative embodiment of the invention has been shown and described, it is to be understood that various modifications and substitutions may be made by those skilled in the art without departing from the novel spirit and scope of the present invention.

What is claimed is:

1. A connector system for an electronic flash unit for use with a camera having a female hot shoe receptacle, which comprises:

a first connector member comprising a lower portion and upper portion, the lower portion including a male hot shoe plug for electrically and mechanically engaging the female hot shoe receptacle of a camera, the upper portion comprising a female hot shoe receptacle for enabling connection thereto of an electronic flash unit having a male hot shoe connector, with the electronic flash unit being connected directly to said upper portion instead of being connected directly to the camera's female hot shoe receptacle;

said first connector member upper portion comprising a pair of metal rods fixed to an insulative support and said first connector member lower portion comprising a pair of metal rods movable relative an insulative support and are coaxial with said fixed metal rods;

means electrically coupling said upper portion to said lower portion so as to provide an electrical connection from the camera female hot shoe receptacle to the upper portion's hot shoe receptacle when the first connector member is connected to the camera, said electrically coupling means comprising metal spring means coupling said metal rods, said metal spring means encircling said metal rods and biasing said movable metal rods downwardly;

electrically conductive extension lines in electrical contact with said first connector member, and means connecting said electrically conductive extension lines to said metal rods;

a second connector member comprising a lower portion and an upper portion, the upper portion of the second connector member comprising a female hot shoe receptacle and the lower portion of said second connector member defining a threaded aperture for receiving a tripod mount;

said second connector member upper portion comprising a pair of metal rods fixed to an insulative support; and means connecting the electrically conductive extension lines to the fixed metal rods of said second connector member, whereby an electrical connection is provided, when the first connector member is connected to the camera, from the camera female hot shoe receptacle to the second connector member;

said fixed metal rods each defining an axial bore and a radial passage from said bore to the outside thereof; said electrically conductive extension lines being connected through said passages to the walls defining said bore.

* * * * *